US006829923B2

(12) United States Patent
Sass et al.

(10) Patent No.: US 6,829,923 B2
(45) Date of Patent: Dec. 14, 2004

(54) APPARATUS AND METHOD FOR INDIRECTLY DETERMINING A TEMPERATURE AT A PREDETERMINED LOCATION IN AN INTERNAL COMBUSTION ENGINE

(75) Inventors: Heiko Sass, Tamm (DE); Thomas Stutte, Reichenbach/Fils (DE); Jens Von Gregory, Remshalden (DE)

(73) Assignee: DaimlerChrysler AG, Stuttgart (DE)

( * ) Notice: Subject to any disclaimer, the term of this patent is extended or adjusted under 35 U.S.C. 154(b) by 58 days.

(21) Appl. No.: 10/289,451

(22) Filed: Nov. 7, 2002

(65) Prior Publication Data

US 2003/0106536 A1 Jun. 12, 2003

(30) Foreign Application Priority Data

Nov. 8, 2001 (DE) ........................................ 101 54 484

(51) Int. Cl.[7] .............................................. G01M 15/00

(52) U.S. Cl. ...................................... 73/117.2; 374/144

(58) Field of Search ............................... 73/116, 117.2, 73/117.3, 118.1, 119 R; 701/29; 340/438, 449; 374/100, 141, 144, 145

(56) References Cited

U.S. PATENT DOCUMENTS 4,556,029 A * 12/1985 Yamaguchi et al. ..... 123/41.15
5,150,300 A 9/1992 Danno et al.
5,201,840 A 4/1993 Sausner et al.
5,544,639 A * 8/1996 Shouda et al. .............. 123/676
5,969,230 A * 10/1999 Sakai et al. ................ 73/23.31
6,026,679 A * 2/2000 Holmes et al. ........... 73/117.3
6,394,045 B1 5/2002 Perset
6,622,548 B1 * 9/2003 Hernandez ................. 73/118.1

FOREIGN PATENT DOCUMENTS

| | | | |
|---|---|---|---|
| DE | 4014966 | A1 | 11/1991 |
| DE | 19907382 | A1 | 8/2000 |
| DE | 10019419 | A1 | 10/2001 |
| EP | 0894954 | A1 | 2/1999 |
| EP | 0942160 | A2 | 9/1999 |
| EP | 1072766 | A1 | 1/2001 |
| EP | 0942160 | A3 | 2/2002 |
| JP | 11325166 | A | 11/1999 |
| WO | WO 99/15769 | | 4/1999 |
| WO | WO 01/12962 | A1 | 2/2001 |

OTHER PUBLICATIONS

Benjamin Pinkel et al., "Cylinder–Temperature Correlation of a Single–Cylinder Liquid–Cooled Engine", Report No. 853, Oct. 1946, Aircraft Engine Research laboratory, Cleveland, Ohio, pp. 285–299.

* cited by examiner

*Primary Examiner*—Eric S. McCall
(74) *Attorney, Agent, or Firm*—Crowell & Moring LLP

(57) ABSTRACT

An apparatus and a process are provided for determining a temperature at a predetermined location in an internal combustion engine. The temperature at a bridge between two exhaust valves of an internal combustion engine can be measured only with great effort during operation. It is proposed to measure a temperature at a location in the internal combustion engine that is easier to access and to determine the bridge temperature with the aid of a computation model on the basis of the engine rpm, the quantity of injected fuel, the temperature of the charge air, and the coolant temperature.

9 Claims, 1 Drawing Sheet

APPARATUS AND METHOD FOR INDIRECTLY DETERMINING A TEMPERATURE AT A PREDETERMINED LOCATION IN AN INTERNAL COMBUSTION ENGINE

This application claims the priority of German application 101 54 484.7, filed Nov. 8, 2001, the disclosure of which is expressly incorporated by reference herein.

BACKGROUND AND SUMMARY OF THE INVENTION

The present invention concerns both an apparatus and a method for indirectly determining a temperature at a predetermined location in an internal combustion engine.

The demands on modern engine management have increased with respect to consumption, performance, emissions, and because of competition. So-called engine heat management is a component that leads to improvement or optimization of all of these disciplines, especially in diesel engines. One of its objectives is to heat the engine to a desired nominal temperature as rapidly as possible. Furthermore, a maximum allowed operating temperature should not be exceeded in the continuous operation.

For this purpose, knowing the temperature at a special position in the cylinder head is of great importance. The temperature at a bridge between two exhaust valves of the internal combustion engine is of particular interest. For construction reasons, suitable direct detection of this temperature for series production is not possible via sensor technology.

German patent publication DE 40 14 966 A1 describes an engine diagnostics method wherein the combustion chamber temperature is determined indirectly. A glow plug configured as a sensor element is used for this purpose. The temperature-dependent internal impedance of the glow plug or the filament is evaluated and the temperature of the internal combustion engine is determined based thereon.

It is an object of the invention to determine in a simple manner a temperature at a location that is difficult to access in an internal combustion engine with the least additional construction complexity.

This object is attained by way of an apparatus for indirectly determining a temperature at a predetermined location in an internal combustion engine which has a sensor that can measure a component temperature mounted on the internal combustion engine, other sensors provided to directly or indirectly detect rpm, a quantity of injected fuel, a temperature of charge air, and coolant temperature as other input variables, and a control unit which can determine the temperature at the predetermined location from the component temperature and the other input variables. The object is also attained by way of method for indirectly determining a temperature at a predetermined location in an internal combustion engine including measuring a component temperature in the internal combustion engine, directly or indirectly determining an engine rpm, a quantity of injected fuel, a temperature of charge air, and a coolant temperature, and calculating the temperature at a predetermined location in a control unit from a component temperature, the engine rpm, the quantity of injected fuel, the temperature of the charge air, and the coolant temperature.

With an apparatus in accordance with the invention, it is possible to determine in a simple manner the temperatures in areas of an internal combustion engine that are difficult to access. For this purpose, a sensor for determining a component temperature is mounted in an area that is easier to access. In addition, based on the component temperature determined in this manner and other input variables, the temperature is then determined at locations that are difficult to access. Additional input variables are considered, such as the engine rpm, the quantity of injected fuel, the temperature of the charge air, and the coolant temperature. These are either determined directly via sensors, or are already available in the control unit of the internal combustion engine as calculated variables. The temperature at the difficult-to-access areas of the internal combustion engine can be determined via this apparatus without utilizing major construction measures.

The sensor for determining the component temperature is preferably mounted in a position that is accessible from outside. This has the advantage of easier electrical contact and the possibility of exchanging the sensor.

The apparatus for determining the temperature is preferably used on a bridge between two exhaust valves of the internal combustion engine. This temperature is of great importance, since this component is highly loaded thermally, on the one hand, and the material thickness at this location is relatively small, on the other hand. The temperature determined in this way can also be used as an input variable for engine control.

A formula for indirect calculation has proven to be useful in tests. The input variables that were used therein, the engine rpm, the quantity of injected fuel, the temperature of the charge air, and the coolant temperature, were determined to be not only necessary but also sufficient for the specification of the physical processes. Improved accuracy in the determination can be achieved by using other input variables.

Other advantages and practical embodiments can be drawn from the other claims, the description of the figures, and from the drawings.

DETAILED DESCRIPTION OF THE INVENTION

Figure 1:
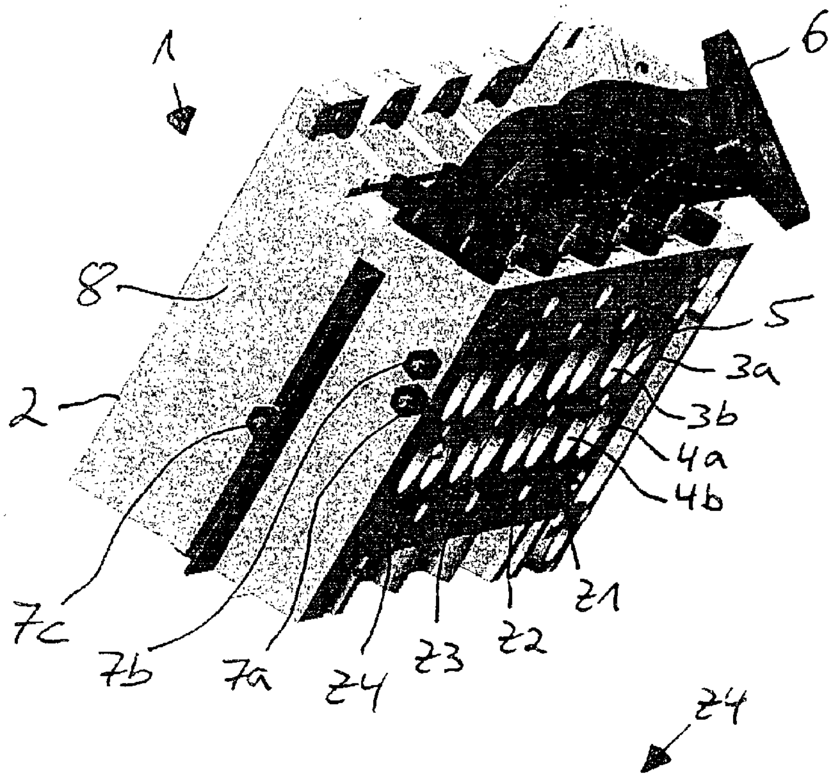
FIG. 1 is a schematic illustration of a cylinder head of an internal combustion engine.

The four-cylinder internal combustion engine identified in FIG. 1 with the reference numeral 1 has two intake valves and two exhaust valves per cylinder Z1 to Z4, respectively. The cylinder head 2 is shown in perspective view in FIG. 1, while the surface of the cylinder head 2 directed to the right faces the combustion chambers, which are not shown. To improve the overview, only the bores 3, 4 corresponding to the valves are shown. Herein, for each cylinder Z1 to Z4, the respective neighboring bores 3*a*, 3*b* or 4*a*, 4*b* for the exhaust or intake valves are provided. The two exhaust channels per cylinder Z1 to Z4 are separated from each other, in turn, by a bridge 5. The exhaust gas discharged via the exhaust channels is then collected in an exhaust manifold 6 and supplied to an exhaust line, which is not shown.

For testing purposes, three component temperature sensors 7*a–c* are mounted on a face 8 of the cylinder head 2 in the design which is shown. Depending upon the predetermined location at which a temperature is to be indirectly determined, a component temperature $T_{Bt}$ measured by one of these component temperature sensors 7*a–c* can be used to determine the desired temperature $T_{bridge}$. It is preferred in accordance with the invention to determine the temperature at the bridge 5 between the two exhaust valves 3a, 3b, which will hereafter be called bridge temperature $T_{bridge}$.

Figure 2:
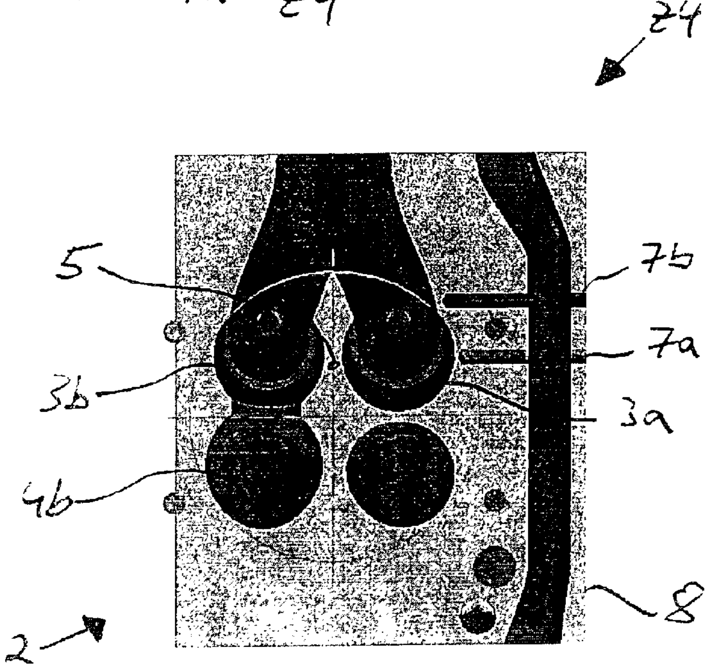
FIG. 2 is a schematic view of the fourth cylinder seen from the side of the valve cover.

As can be seen in FIG. 2, which is a view of the cylinder head 2 of the cylinder Z4 seen from the valve cover, the two component temperature sensors 7a and 7b extend from the face 8 of the cylinder head 2 up to the area of the outermost exhaust valve 3a of the cylinder head Z4. This position is, on the one hand, easy to access from outside and, on the other hand, it is also as close as possible to the location at which the temperature $T_{bridge}$ is to be determined. The arrangement of a temperature sensor directly in the area of the bridge 5 instead would be very complicated from the point of view of the construction.

Based on a computation model, the bridge temperature $T_{bridge}$ can now be determined with sufficient accuracy, starting from the measured component temperature $T_{Bt}$. For this calculation, the engine rpm $N_{BKM}$, the quantity KM of injected fuel, the temperature $T_{L1}$ of the charge air, and the coolant temperature $T_{Km}$ are utilized as input variables. The tests that were conducted have demonstrated that these four input variables, together with the measured component temperature $T_{Bt}$, specify the physical processes in the combustion chamber with sufficient accuracy, as well as the temperature change at the bridge 5. Other input variables can also be used if greater accuracy is required. The four input variables can either be determined directly by way of sensors, which are not shown, which can sense, for example, the temperature of the charge air and the coolant, or are already available as calculated variables, for example, the quantity of injected fuel, in a control unit, which is not shown. If, in turn, the current engine rpm $N_{B<M}$ is used as an input variable, then this variable can also be determined directly with the aid of a sensor. However, it is preferable to provide a time averaged engine rpm signal by the control unit.

The determination of the bridge temperature $T_{bridge}$ takes place starting from the measured component temperature $T_{Bt}$ with the aid of a functional relationship as shown, for example, in the following equation:

$$T_{bridge} = \begin{pmatrix} k_1 \cdot N_{BKM} + k_2 \cdot (N_{BKM})^2 + k_3 \cdot KM + k_4 \cdot (KM)^2 + \\ k_5 \cdot T_{Kw} + k_6 \cdot (T_{Kw})^2 \end{pmatrix} \cdot T_{Bt} + k_7 \cdot (T_{L1} - k_8)$$

wherein ($T_{bridge}$)=temperature at the bridge ($T_{Bt}$)=measured component temperature ($N_{BKM}$)=engine rpm (KM)=quantity of injected fuel ($T_{Kw}$)=coolant temperature ($T_{L1}$)=temperature of the charge air ($k_1$) to ($k_8$)=constants The weighting factors $k_1$ to $k_8$ are dependent upon the corresponding configuration of the internal combustion engine 1. For a given internal combustion engine 1, the determination of these weighting factors will preferably take place with the aid of a mathematical identification process. For this purpose, aside from the component temperature $T_{Bt}$ and the other input variables, the bridge temperature $T_{bridge}$ is also measured on the engine test bed or in the vehicle, so that the weighting factors k1 to k8 can be adapted to the measured values.

The method in accordance with the invention is very simple, since the necessary input variables are already available in the control units of modern internal combustion engines 1. Only a component temperature sensor 7 is therefore necessary. Positioning of the component temperature sensor can be optimized in the sense of a simpler construction and the greatest possible proximity to the location at which the temperature $T_{bridge}$ is to be determined.

Aside from the determination of the bridge temperature $T_{bridge}$ described above, the temperature at any other desired location of the internal combustion engine 1 can also be determined accordingly. These are preferably locations that are difficult to access from outside with the aid of a sensor.

The bridge temperature $T_{bridge}$ determined in this way is preferably used again as an input variable for engine control. It provides, on the one hand, knowledge about the temperatures existing in the combustion chamber. On the other hand, regulation of the cooling capacity, for example, which works conventionally on the basis of the coolant temperature, can take place based on this bridge temperature $T_{bridge}$.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. An apparatus for indirectly determining a temperature at a predetermined location in an internal combustion engine, comprising:

a sensor which can measure a component temperature mounted on the internal combustion engine;

other sensors provided to directly or indirectly detect rpm, a quantity of injected fuel, a temperature of charge air, and coolant temperature as other input variables; and a control unit which can determine the temperature at the predetermined location from the component temperature and the other input variables.

2. The apparatus of claim 1, wherein the sensor is mounted at a location in said internal combustion engine which is accessible from outside.

3. The apparatus of claim 2, wherein said sensor is provided on a face wall of said internal combustion engine.

4. The apparatus of claim 1, wherein the control unit determines a temperature at a bridge between two exhaust valves of said internal combustion engine.

5. A method for indirectly determining a temperature at a predetermined location in an internal combustion engine, comprising:

measuring a component temperature in the internal combustion engine;

directly or indirectly determining an engine rpm, a quantity of injected fuel, a temperature of charge air, and a coolant temperature; and calculating the temperature at a predetermined location in a control unit from a component temperature, the engine rpm, the quantity of injected fuel, the temperature of the charge air, and the coolant temperature.

6. The method of claim 5, wherein a time averaged value is used as engine rpm.

7. The method of claim 5, wherein said temperature at the predetermined location is calculated based on the following formula $$T_{bridge} = \begin{pmatrix} k_1 \cdot N_{BKM} + k_2 \cdot (N_{BKM})^2 + k_3 \cdot KM + k_4 \cdot (KM)^2 + \\ k_5 \cdot T_{Kw} + k_6 \cdot (T_{Kw})^2 \end{pmatrix} \cdot T_{Bt} + k_7 \cdot (T_{L1} - k_8)$$

wherein ($T_{bridge}$)=temperature at the bridge, ($T_{Bt}$)=measured component temperature, ($N_{BKM}$)=engine rpm, (KM)=quantity of injected fuel, ($T_{Kw}$)=coolant temperature, ($T_{L1}$)=temperature of the charge air, and ($k_1$) to ($k_8$)=constants.

8. The method of claim 5, wherein further input variables are used in the calculation of said temperature at the predetermined location.

9. The method of claim 5, wherein the temperature at the predetermined location is used as an input variable for engine control.

* * * * *